US012541916B2

(12) United States Patent
Dheur et al.

(10) Patent No.: US 12,541,916 B2
(45) Date of Patent: Feb. 3, 2026

(54) METHOD FOR ASSESSING THE PHYSICALLY BASED SIMULATION QUALITY OF A GLAZED OBJECT

(71) Applicant: SAINT-GOBAIN GLASS FRANCE, Courbevoie (FR)

(72) Inventors: Marie-Christine Dheur, Sceaux (FR); Simon Mazoyer, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 265 days.

(21) Appl. No.: 18/258,729

(22) PCT Filed: Dec. 9, 2021

(86) PCT No.: PCT/EP2021/084885
§ 371 (c)(1),
(2) Date: Jun. 21, 2023

(87) PCT Pub. No.: WO2022/135942
PCT Pub. Date: Jun. 30, 2022

(65) Prior Publication Data
US 2024/0046561 A1    Feb. 8, 2024

(30) Foreign Application Priority Data

Dec. 21, 2020    (EP) ..................................... 20306637

(51) Int. Cl.
*G06T 17/00*    (2006.01)
*G06T 7/11*    (2017.01)
(Continued)

(52) U.S. Cl.
CPC ................ *G06T 17/00* (2013.01); *G06T 7/11* (2017.01); *G06T 7/90* (2017.01); *G06T 15/04* (2013.01);
(Continued)

(58) Field of Classification Search
None
See application file for complete search history.

(56) References Cited

U.S. PATENT DOCUMENTS 10,217,242 B1    2/2019 Pytel et al.
2004/0012542 A1    1/2004 Bowsher et al.
(Continued)

OTHER PUBLICATIONS

Nathaniel L. Jones, Christoph F. Reinhart, "Experimental validation of ray tracing as a means of image-based visual discomfort prediction", Feb. 15, 2017, Elsevier, Building and Environment, vol. 113, pp. 131-150.*

(Continued)

*Primary Examiner* — Robert Bader
(74) *Attorney, Agent, or Firm* — Pillsbury Winthrop Shaw Pittman LLP

(57) ABSTRACT

A method for assessing the physically based simulation quality of a glazed objects, in particular glazing buildings or glazing vehicles. A hyperspectral canopy hemispherical image of a real sky at given daylight conditions and an image of glazed object, both synchronously acquired, are processed into a physically based rendering to evaluate the colour difference between glazing parts of a rendered representative glazed object and the glazed object of the provided image. An outstanding advantage is a realistic rendering of a glazed object by an accurate rendering of reflecting effects coming from the sky onto glazed parts whatever the viewing angles.

15 Claims, 2 Drawing Sheets

(51) Int. Cl.
  *G06T 7/90* (2017.01)
  *G06T 15/04* (2011.01)
  *G06T 15/20* (2011.01)
  *G06T 15/50* (2011.01)
  *H04N 23/12* (2023.01)
  *H04N 23/698* (2023.01)

(52) U.S. Cl.
  CPC .......... *G06T 15/20* (2013.01); *G06T 15/506* (2013.01); *H04N 23/12* (2023.01); *H04N 23/698* (2023.01); *G06T 2207/10036* (2013.01); *G06T 2215/12* (2013.01)

(56) References Cited

U.S. PATENT DOCUMENTS

| | | | |
|---|---|---|---|
| 2017/0287196 A1* | 10/2017 | Raeburn | G06T 15/506 |
| 2018/0144547 A1* | 5/2018 | Shakib | G06T 15/503 |
| 2018/0359416 A1* | 12/2018 | Hold-Geoffroy | G06V 10/82 |
| 2019/0026937 A1* | 1/2019 | Benoit | G06T 15/506 |
| 2019/0164335 A1* | 5/2019 | Sheffield | G06T 17/00 |

OTHER PUBLICATIONS

Jakob Barz, Niklas Henrich, Stefan Muller, "Validating Photometric and Colorimetric Consistency of Physically-Based Image Synthesis", Jun. 17, 2010, Society for Imaging Science and Technology, Conference onColour in Graphics, Imaging, and Vision, vol. 2010, pp. 148-154.*

Shunping Jia, Zijie Qina, Jie Shanb, Meng Lu, "Panoramic SLAM from a multiple fisheye camera rig", Nov. 29, 2019, Elsevier, ISPRS Journal of Photogrammetry and Remote Sensing, vol. 159, pp. 169-183.*

Takuma Morimoto, Sho Kishigami, João M. M. Linhares, Sergio M. C. Nascimento, Hannah E. Smithson, "Hyperspectral environmental illumination maps: characterizing directional spectral variation in natural environments", Oct. 28, 2019, The Optical Society, Optics Express, vol. 27, Issue 22, pp. 32277-32293.*

Jessi Stumpfel, Andrew Jones, Andreas Wenger, Chris Tchou, Tim Hawkins, Paul Debevec, "Direct HDR Capture of the Sun and Sky", Jul. 30, 2006, ACM, Siggraph '06: ACM Siggraph 2006 Courses.*

International Search Report as issued in International Patent Application No. PCT/EP2021/084885, dated Jun. 8, 2022.

Meseth, J., et al., "Verification of Rendering Quality from Measured BTFs," Proceedings APGV 2006. Symposium on Applied Perception in Graphics and Visualization, Jul. 2006, XP058193561, pp. 127-134.

Clausen, O., et al., "Acquisition and Validation of Spectral Ground Truth Data for Predictive Rendering of Rough Surfaces", Computer Graphics Forum: Journal of the European Association for Computer Graphics, vol. 37, No. 4, Jul. 2018, XP055810535, pp. 1-12.

Tagaki, A., et a., "Accurate rendering technique based on colorimetric conception," Computer Graphics, vol. 24, No. 4, Sep. 1990, XP058098665, pp. 263-272.

Mohelnikova, J., Materials for reflective coatings of window glass applications, Construction and Building Materials, vol. 23, No. 5, May 2009, XP025917355, pp. 1993-1998.

* cited by examiner

METHOD FOR ASSESSING THE PHYSICALLY BASED SIMULATION QUALITY OF A GLAZED OBJECT

CROSS-REFERENCE TO RELATED APPLICATIONS

This application is the U.S. National Stage of PCT/EP2021/084885, filed Dec. 9, 2021 which in turn claims priority to European patent application number 20306637.8 filed Dec. 21, 2020. The content of these applications are incorporated herein by reference in their entirety.

TECHNICAL FIELD

The disclosure relates to a method for assessing the physically based simulation quality of glazed objects, in particular glazing buildings or glazing vehicles.

BACKGROUND ART

In various industrial areas, the recent advances in computer simulation allow to provide virtual realistic previews of articles before their actual manufacturing, retrofitting or refurbishment. These previews may help to benchmark different forecasted articles and find out those that indeed fulfil the technical and aesthetical requirements that are looked for.

Today, there is also a strong and ever-growing demand from customers to provide some realistic insights of future outcomes of complex refurbishment and/or retrofitting operations onto which they may confidently ground a decision whether they want to proceed further with them.

In building and automotive industry, it is now a common practice to use simulation tools and models, such as physically based rendering methods or ray tracing methods, to generate digital representations of physical and/or functional aspects of building and automotive to forecast aesthetics before their construction or refurbishment.

However, owing to the reflecting and transparent nature of their glazed facades, simulation of realistic representations of building or automotive under a real environment is still challenging. As daylight conditions determine the way the sky and other elements from the surrounding landscape are reflected onto the glazed facades, outward appearance of the building or automotive may change considerably depending on daytime and weather conditions, e.g. cloudy, rainy or sunny weather.

US 2004012542 A1 describes a rendering system to provide rendered image of a building in which colour scales are available to render colours of a procured image of a building.

U.S. Ser. No. 10/217,242 B1 describes a system and a method to provide rendered images of a building, in which the colours and brightness of each building material are adjusted through a series of manual adjustment steps until they match a colour calibrated photograph.

Jan Meseth et al., 'Verification of rendering quality from measured BTFs', ACM SIGGRAPH Symposium on Applied Perception in Graphics and Visualization, 2006, p. 127-134, describes a method investigate the degree of realism with bidirectional texture functions (BTFs) by comparing global light distribution between photographs and rendered images of a car interior. The lighting environments for the rendering are acquired from a series of pictures of reflecting sphere taken at varying exposure times.

SUMMARY OF THE INVENTION

Technical Problem

Current rendering methods and systems may suffer several drawbacks, in particular for rendering glazed facades.

First, the outward appearance of glazed objects may only be rendered in respect to the daylight conditions and the viewing angle captured within the reference static photographs or images that are used to adjust the colour, brightness conditions in the simulated scene. Thus, they may fail to render accurately a glazed object from other viewing angles since the sky and other elements from the surrounding landscape that may be reflected onto the glazed facades are not available in the simulated scene.

Second, when rendering of glazed objects is performed based on a side-by-side comparison between the rendered glazed objects and photographs and/or images in order to try to mimic the colours of the real glazed objects, issues may arise to find a matching reference colour space between the rendering and the photographs and/or images.

Third, if elements of the glazed object, e.g. building materials or glazing, are captured at different times, the lighting conditions may vary between photographs. Anaesthetic and unrealistic colour variations may occur within the rendered object. Consequently, inaccurate images of glazed objects may be provided to customers who may then feel deceit when facing the true, i.e. real, outcomes afterwards.

Fourth, the time and the position of the rendered glazed object in respect to the chosen sky and surrounding environment for the simulated scene may not correspond to those of the reference photographs used to adjust colour parameters. Difficulties may then arise during colour adjustment operation as the colour differences between the rendered glazed object and the photographs could not be reduced satisfactorily beyond a given threshold because of this discrepancy.

Solution to Problem

The present invention solves the aforementioned problems. It relates to a computer implemented method and a system as described in claims 1 and 10 respectively, depending claims being advantageous embodiments.

Accordingly, a first object of the disclosure is to provide a computer implemented method for assessing the physically based simulation quality of glazed object. A hyperspectral canopy hemispherical image of a real sky at given daylight conditions and an image of glazed object, both synchronously acquired, are processed into a physically based rendering method to evaluate the colour difference between glazing parts of a rendered representative glazed object and the glazed object of the provided image.

In the scope of the disclosure, 'sky' is to be understand as encompassing the whole surrounding environment of the glazed object which is not hidden by said glazed object. Accordingly, a 'sky' may comprise the sky itself and the surrounding landscape of the glazed object. The 'sky' may be a natural sky, i.e. outdoor sky, or an artificial sky, i.e. outdoor sky.

A second object of the disclosure is to provide a system to implement the method according to the disclosure.

Advantageous Effects of the Invention

A first outstanding advantage of the disclosure may be a realistic rendering of a glazed object by an accurate rendering of reflecting effects coming from the sky onto glazed parts whatever the viewing angles.

Another outstanding advantage may be that a matching reference colour space between the rendering and the photographs and/or images is no longer needed. Significant improvements are obtained for rendering 360° virtual realistic previews of glazed objects.

According to certain embodiments, thanks to the hyperspectral canopy hemispherical image, there may also be no need for a set of photographs or images of the glazed object. Unexpected side-effects such as colour variations that may come from the different daytimes at which said photographs or images are captured are suppressed.

Another advantage may be that the sky and surrounding environment for the simulated scene corresponds to those of the hyperspectral canopy hemispherical image. Operations related to colour adjustment are simplified, suppressing, at least drastically reducing, the risk of colour discrepancy between the reality and the rendering.

DESCRIPTION OF EMBODIMENTS

Figure 1:
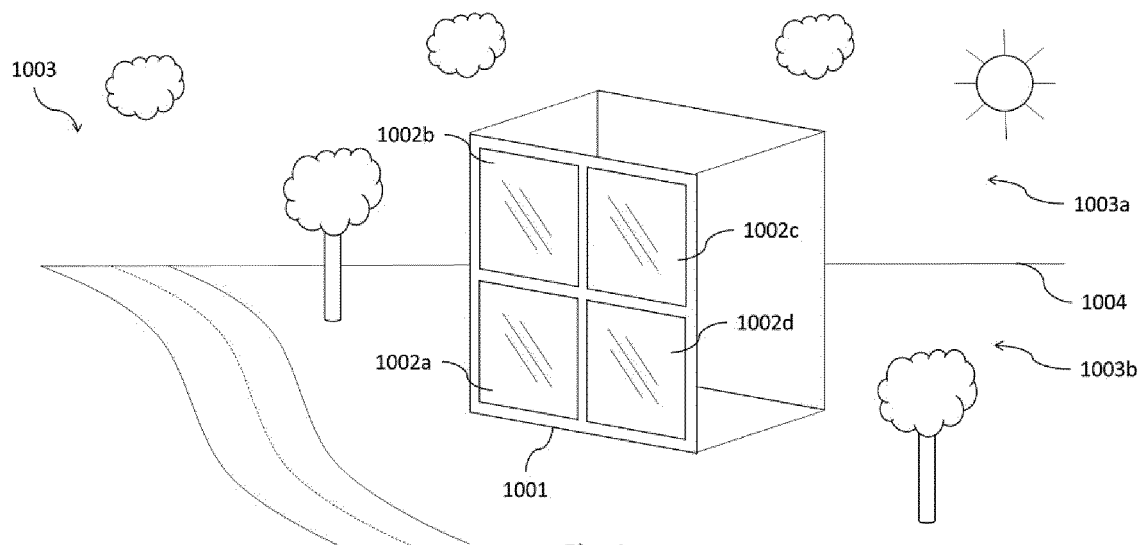
FIG. 1 is schematic representation of glazed object in an exterior environment.

An example of a real glazed object in a real exterior environment is schematically represented in [FIG. 1]. The glazed object 1001 may comprise glazed surfaces 1002*a-d*, for instance glazing panes, and may be located at a specific location regarding a sky 1003 in given daylight conditions. In the context of the disclosure, the sky 1003 encompasses the whole surrounding environment of the glazed object 1001 which is not hidden by said glazed object 1001. On [FIG. 1], it may comprise everything above and under the skyline 1004 which is not hidden by the glazed object 1001. It may comprise the sky itself 1003*a* and the surrounding landscape 1003*b* of the glazed object 1001.

For sake of illustration, the weather on [FIG. 1] is mainly sunny with some clouds but it may be of any kind, i.e. cloudy, rainy, foggy, sunny, etc. The glazed object 1001 is a glazed building, but it may be a glazed vehicle, for instance a glazed automobile, as well.

Another example of real glazed object in a real exterior environment may be a glazed automotive under an artificial sky in an indoor place (e.g. a show room or an exhibition room) or under a real sky in an outdoor place (e.g. urban landscape or countryside landscape).

Figure 2:
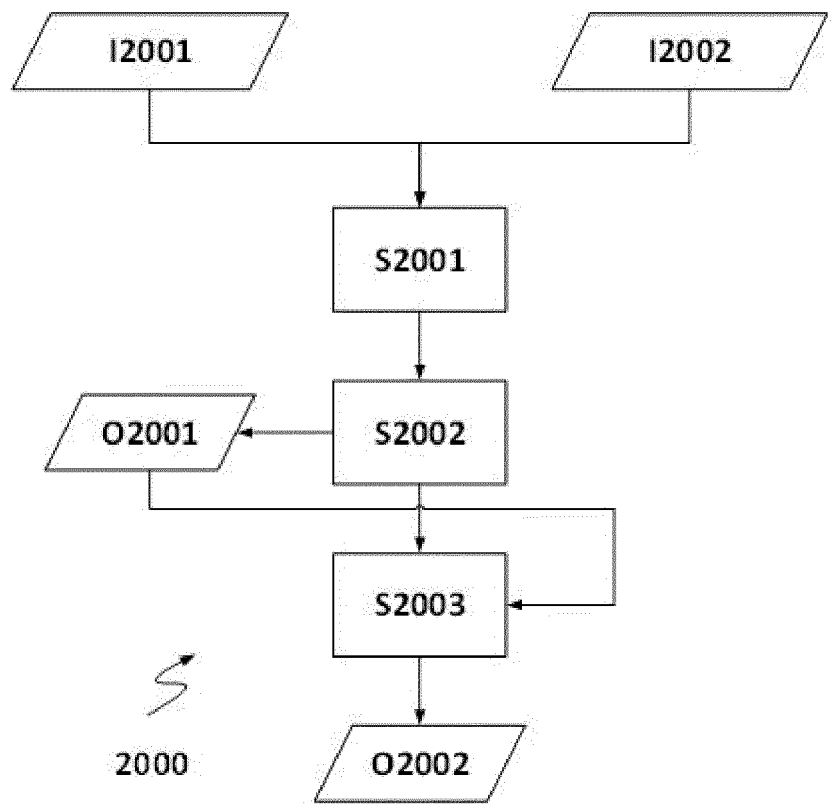
FIG. 2 is a logical data flow diagram of a method according to certain embodiments.

With reference to [FIG. 2], there is provided a computer implemented method 2000 for assessing the physically based simulation quality of glazed object 1001, said method 2000 comprises the following steps:

(1) providing S2001 an input hyperspectral canopy hemispherical image I2001 of a real sky 1003 at given daylight conditions and an input image I2002 of a real glazed object 1001 under said real sky 1003 at same said daylight conditions, wherein both input images I2001, I2002 are synchronous;

(2) physically based rendering S2002 a representative glazed object model O2001 of the real glazed object 1001 in a 3D scene, wherein an environment map in said 3D scene is computed from the input hyperspectral canopy hemispherical image I2001 of said real sky 1003, and wherein the representative glazed object model O2001 is at same spatial location regarding said environment map in said 3D scene than the real glazed object 1001 regarding the real sky 1003;

(3) calculating S2003 the colour difference O2002 in a given colour space between part of at least one glazing of the rendered representative glazed object model O2001 and the corresponding part of the corresponding at least one glazing of the real glazed object 1001 in the input image I2002 of said real glazed object 1001, wherein said part of said least one glazing of the simulated representative glazed object model O2001 is in the view frustum of a virtual camera in the 3D scene, and wherein the viewing angle of said virtual camera corresponds to the viewing angle of the real glazed object 1001 in the input image I2002 of the real glazed object 1001.

One aim of the method is to provide a measure of the colour difference O2002 in a given colour space between part of at least one glazing of a rendered representative glazed object model O2001 and the corresponding part of the corresponding at least one glazing of the real glazed object 1001. The measured colour difference O2001 is an indicator of the quality of the rendering. The lowest the difference is, the better the rendered image. Consequently, the method 2000 may be used for accurate and realistic rendering of glazed object while solving the aforementioned problems of the state of art.

Any colour space may be used as long as it is adapted for physically based rendering. In particular, it may be the L*a*b* colour system developed by the International Commission on Illumination (CIE), more particularly a colour system as described in ASTM C1376 and ASTM D2244 standards. As rule of thumb, a glazed object may be considered as accurately and realistic rendered when the colour difference $\Delta E$ in the CIE L*a*b* system is below 10, preferably below 5, more preferably below or equal to 1, ideally 0.

The measured colour difference O2002 may be one or more single values on one or more part of one or more glazing panes or an average value on one or more zones of one or more part of one or more glazing panes. It is a matter of choice depending on zones of interest in the rendering. For example, one may only be interested in some part of glazing, e.g. bottom glazing panes, glazed roofs or top glazing panes of a glazed object. There is then no need to focus on non-relevant parts of a glazing pane or non-relevant glazing panes. This approach may save computing resource and times.

Several kind of physically based rendering engines may be used in step (2). Those available in the art may eventually suit. For examples, engines such as Indigo renderer, LuxCoreRender or Ocean renderer may be used.

The canopy hemispherical image I2001 is a hyperspectral image, i.e. a data cube image in which an electromagnetic spectrum is provided for each pixel. The hyperspectral image may contain at least visible spectra when one may want to provide realistic and accurate rendering of glazed objects for human, which is usually the main objective of most rendering applications.

However, this should not be regarded as a limitation. For instance, the hyperspectral image may further contain infrared spectra when one may want to render realistic and accurate rendering images to assess the thermal performances of a glazed object.

Both hyperspectral canopy hemispherical image I2001 of a real sky 1003 at given daylight conditions and image I2002 of a real glazed object 1001 under said real sky 1003 at same said daylight conditions are synchronous. Preferably both images may be acquired simultaneously in position and time to prevent unwanted shifts between the rendered glazed object model and the environment map during rendering. Complementarily or alternatively, in particular if both images are not acquired simultaneously or some shifts may be expected owing to technical limitations in the acquisition system, both may contain a target pattern which may be used afterwards as reference to resynchronise the images.

Advantageously, the input image I2002 of a real glazed object 1001 may also be a hyperspectral image. A hyperspectral canopy hemispherical image I2001 of a real sky at given daylight conditions is prerequisite for assessing the physically based simulation quality of a real glazed object 1001 according to the disclosure. In most cases, any good quality image of a real glazed surface may be enough to obtain satisfactory results. However, a hyperspectral image of the real glazed object 1001 may be valuable because it may allow a more accurate assessment of the physically based rendering. Owing to the spectral information it contains, a hyperspectral image of the glazed object provides more flexibility in the choice of the reference colour space between said hyperspectral image and the rendered image of the glazed object, in particular when glazed objects are complex ones regarding the nature of materials and the arrangement of their glazing panes.

In certain embodiments, the method 2000 may further comprise, before step (2), a step of colour shift correction of the input images I2001, 2002. Colour shifts may occur when two different optical acquisition devices are used to acquire the hyperspectral canopy hemispherical image of a real sky and the image of a real glazed object. Owing to their different optics and sensors, the acquisition devices may have different sensitivity regarding lighting conditions and/or illumination. As a consequence, they may adjust their brightness and colour scales differently in same illumination conditions, which in turn yields to colours shifts between the images they provide respectively. A colour shift correction may then be advantageous to prevent further shifts during the rendering.

In advantageous embodiment, both the input hyperspectral canopy hemispherical image I2001 of the real sky 1003 and the input image I2002 of the real glazed object 1001 may comprise at least one same target pattern, and said same target pattern is used in step (2) as a reference for the spatial location of the representative glazed object in the 3D scene. As discussed above, unwanted shifts between the rendered glazed object model and the environment map may occur during rendering, in particular if both images are not acquired simultaneously or some shifts may be expected owing to technical limitations in the acquisition system. A target pattern may then be advantageous to resynchronised both images to prevent these unwanted shifts.

Alternatively, in certain embodiments, the real glazed object 1001 is in the input hyperspectral canopy hemispherical image I2001 of the real sky 1003, and the input image I2002 of the real glazed object 1001 is a portion of that image I2001. In this embodiment, the image I2002 of the real glazed object 1001 is a hyperspectral image and is fully synchronised with the hyperspectral canopy hemispherical image I2001 of a real sky 1003, providing the above mentioned advantages simultaneously.

In certain embodiments, the method 2000 may comprise before step (2) a step of providing a 3D description of the real glazed object 1001, and the representative glazed object model O2001 of the real glazed object 1001 may be rendered from said 3D description. A 3D description of the real glazed object 1001 may be, for instance, a cloud point of geometric patterns of the real glazed object that are acquired from different directions and/or orientations. The shape of the real glazed object 1001 may then be reconstructed from fitting of the cloud point to provide a 3D model O2001 of said object.

The method 2000 according to the disclosure is well adapted for assessing the physically based simulation quality of a glazed building or a glazed automotive. A glazed automotive is to be understand as encompassing all automotive which comprises at least one glazed surface through which passengers can be see exterior from passenger compartments, for instance any glazing pane for inside/outside separation. Examples of glazing panes may be a windshield, side and/or rear windows, or glass panel roofs.

Further, the method 2000 according to the disclosure may be used to simulate accurately different views of a representative glazed object of a real glazed object 1001, with value of the colour difference O2002, e.g. ΔE in the CIE L*a*b* system, provided by said method 2000 being between 1 and 10, preferably between 1 and 5, more preferably below 1.

Figure 3:
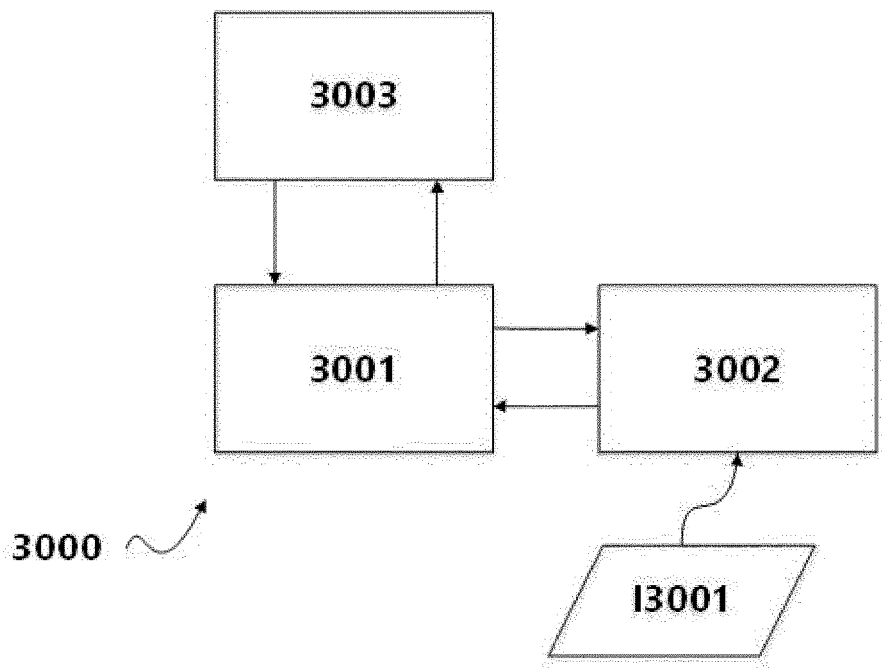
FIG. 3 is a physical data flow diagram of a processing data system to implement a method according to the invention.

The method of the invention can be computer implemented. With reference to [FIG. 3], according to certain embodiment, there is provided a data processing system 3000 comprising means for carrying out a method 2000 according to any of the embodiments described herewith. Example of means for carrying out the method is a device 3001 which can be instructed to carry out sequences of arithmetic or logical operations automatically to perform tasks or actions. Such device, also called computer, can comprise one or more Central Processing Unit (CPU) and at least a controller device that are adapted to perform those operations. It can further comprise other electronic components like input/output interfaces 3003, non-volatile or volatile storage devices 3003, and buses that are communication systems for the data transfer between components inside a computer, or between computers. One of the input/output devices can be user interface for human-machine interaction, for example graphical user interface to display human understandable information.

As calculation and/or simulation of electric and/or electromagnetic properties may require a lot of computational power to process large amounts of data, the data processing system 3000 may advantageously comprise one or more Graphical Processing Units (GPU) whose parallel structure makes them more efficient than CPU, in particular for image processing in ray tracing.

Certain embodiment may also provide a computer program I3001 comprising instructions which, when the program is executed by a computer, cause the computer to carry out a method 2000 according to any embodiments described herein.

Any kind of programming language, either compiled or interpreted, can be used to implement the steps of the method of the invention. The computer program can be part of a software solution, i.e. part of a collection of executable instructions, code, scripts or the like and/or databases.

Certain embodiment can provide a computer-readable medium 3002 comprising instructions which, when executed by a computer, cause the computer to carry out the method according to any of the embodiments described herein.

The computer-readable storage 3002 is preferably a non-volatile storage or memory, for example hard disk drive or solid-state drive. The computer-readable storage can be removable storage media or a non-removable storage media as part of a computer.

Alternatively, the computer-readable storage may be a volatile memory inside a removable media.

The computer-readable storage 3002 can be part of a computer used as a server from which executable instructions can be downloaded and, when they are executed by a computer, cause the computer to carry out a method according to any of the embodiments described herein.

Alternatively, the program may be implemented in a distributed computing environment, e.g. cloud computing. The instructions can be executed on the server to which client computers can connect and provide encoded data as inputs to the method. Once data are processed, the output can be downloaded and decoded onto the client computer or directly send, for example, as instructions. This kind of implementation can be advantageous as it can be realised in a distributed computing environment such as a cloud computing solution.

A second object of the disclosure is to provide a system to implement a method 2000 according to the disclosure. With reference to [FIG. 4], there is provided a system 4000 for assessing the physically based simulation quality of a glazed object, said system 4000 comprising:

means 4001 for synchronously acquiring a hyperspectral canopy hemispherical image I2001 of a real sky 1003 at given daylight conditions and an image of a real glazed object 1001 under said real sky 1003 at same said daylight conditions;

means 4002, e.g. a computing workstation, for physically based rendering of a representative glazed object model O2001 of the real glazed object 1001 in a 3D scene, wherein the input hyperspectral canopy hemispherical image I2001 of said real sky 1001 is used as an environment map in said 3D scene, and wherein the representative glazed object model O2001 is at same spatial location regarding said environment map in said 3D scene than the real glazed object 1001 regarding the real sky 1003;

means 4002, e.g. a computing workstation, for calculating the colour difference O2002 in a given colour space between part of at least one glazing of the simulated representative glazed object model O2001 and the corresponding part of the corresponding at least one glazing of the real glazed object 1001 in the input image I2002 of said real glazed object 1001, wherein said part of said least one glazing of the simulated representative glazed object model O2001 is in the view frustum of a virtual camera in the 3D scene, and wherein the viewing angle of said virtual camera corresponds to the viewing angle of the real glazed object 1001 in the input image I2002 of the real glazed object 1001.

Figure 4:
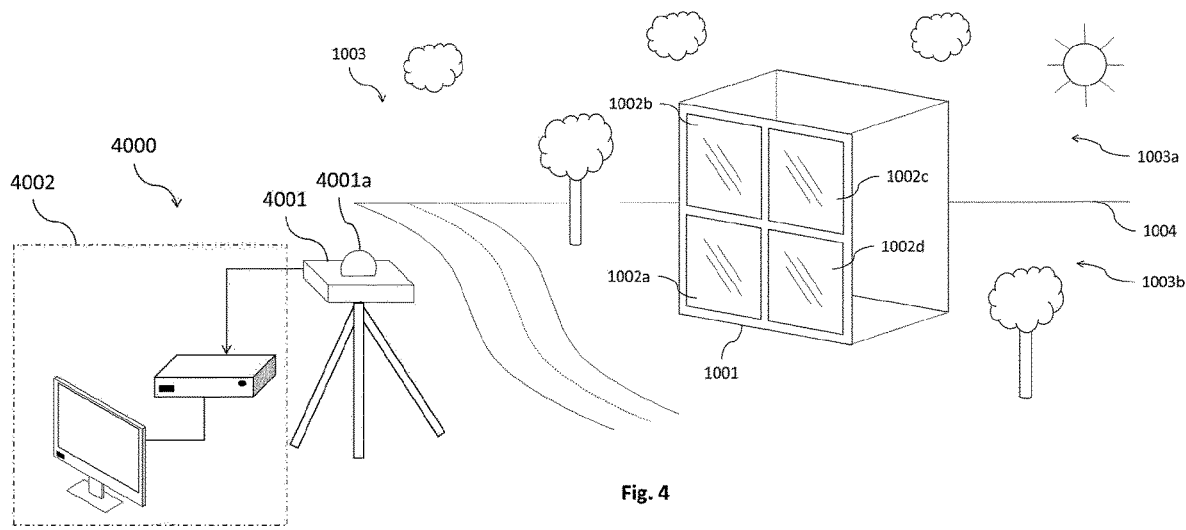
FIG. 4 is a schematic representation of a system according to certain embodiments.

In certain embodiment, with reference to [FIG. 4], means 4001 for acquiring may comprise a hyperspectral 360° acquiring system camera 4001a, e.g. a 360° fisheye camera, which is adapted to acquire a hyperspectral canopy hemispherical image I2001 of a real sky 1003 of a real glazed object (1001) at given daylight conditions. A portion of said image I2001 may then comprise a real glazed object 1001, and the system may further comprise means for extracting said portion of image from the hyperspectral canopy hemispherical image (I2001) of the real sky (1003). Said extracting means may be image processing operations, e.g. threshold segmentation, edge detection filter.

In alternative embodiments (not represented), means 4001 for acquiring may comprise:

a hyperspectral camera which may be adapted to acquire a hyperspectral canopy hemispherical image I2001 of a real sky 1003 at given daylight conditions, a digital camera which may be adapted to acquire an image I20012 of a real glazed object 1001 under said real sky 1003 at same said daylight conditions.

The cameras may be assembled to each other by means of an automated rotation stage, e.g. precise mechanical automated rotation stage, said automated rotation stage may allow a synchronous rotation of both cameras so that they may acquire spatially and timely synchronized 360° images.

In certain embodiments, the system 4000 may further comprise a target pattern to be imaged by both cameras when acquiring the hyperspectral canopy hemispherical image I2001 of a real sky 1003 and the image I2002 of the real glazed object 1001, and means 4002 for physically based simulation may be configured to compute the spatial location of the representative glazed object model (O2001) in the 3D scene from images of the target pattern. Examples of target pattern are described in the art. Without any limitation, they may be periodic pattern of horizontal and/or vertical lines, or patterned sphere.

As discussed above, a target pattern is advantageous to avoid unwanted shifts between the rendered glazed object model and the environment map may occur during rendering, in particular if both images are not acquired simultaneously or some shifts may be expected owing to technical limitations in the acquisition system.

In certain embodiments (not represented), the system 4000 may further comprise a 3D scanner to acquire a 3D description of the real glazed object 1001, and means 4002 for physically based simulation may configured to simulate the representative glazed object model O2001 of the real glazed object 1001 from said 3D description.

3D scanners are known to provide 3D description of object, for instance, as cloud points of geometric patterns of the object that are acquired from different directions and/or orientations. The shape of the object may then be reconstructed from fitting of the cloud point to provide a 3D model of the object.

It is to be understood that the embodiments described herein are the most preferred embodiments to describe the invention. These embodiments may be combined unless their respective functions appear incompatible for such combination.

It is to be further understood that the invention is not limited to the disclosed embodiments. It is intended to cover equivalent arrangements included within the scope of the claims.

The invention claimed is:

1. A computer implemented method for assessing a physically based simulation quality of glazed object, said method comprising:

(1) providing an input hyperspectral canopy hemispherical image of a real sky at given daylight conditions and an input image of a real glazed object under said real sky at same said daylight conditions, wherein both the hyperspectral canopy hemispherical image and the input image of the real glazed object are synchronous;

(2) physically based rendering a representative glazed object model of the real glazed object in a 3D scene, wherein an environment map in said 3D scene is computed from the input hyperspectral canopy hemispherical image of said real sky, and wherein the representative glazed object model is at same spatial location regarding said environment map in said 3D scene as the real glazed object regarding the real sky;

(3) calculating a colour difference in a given colour space between part of at least one glazing of the rendered representative glazed object model and the corresponding part of the corresponding at least one glazing of the real glazed object in the input image of said real glazed object, wherein said part of said least one glazing of the simulated representative glazed object model is in the view frustum of a virtual camera in the 3D scene, wherein a viewing angle of said virtual camera corresponds to a viewing angle of the real glazed object in the input image of the real glazed object, and wherein both the input hyperspectral canopy hemispherical image of the real sky and the input image of the real glazed object comprise at least one same target pattern.

2. The method according to claim 1, wherein the input image of a real glazed object is a hyperspectral image.

3. The method according to claim 1, further comprising before step (2) performing a step of color shift correction of the input hyperspectral canopy hemispherical image and the input image of the real glazed object.

4. The method according to claim 1, wherein said same target pattern is used in step (2) as a reference for the spatial location of the representative glazed object model in the 3D scene.

5. The method according to claim 1, wherein said method comprises before step (2) a step of providing a 3D description of the real glazed object, and wherein the representative glazed object model of the real glazed object is simulated from said 3D description.

6. The method according to claim 1, wherein the real glazed object is a glazed building or a glazed automotive.

7. A method comprising performing said method according to claim 1 to simulate different views of a representative glazed object model of a real object, wherein the value of the color difference $\Delta E$ in the CIEL* a* b* system provided by said method is between 1 and 10.

8. The method according to claim 7, wherein the value of the color difference $\Delta E$ in the CIE L* a* b* system provided by said method is between 1 and 5.

9. A data processing system comprising a processor and a non-transitory computer readable medium coded with instructions for carrying out a method according to claim 1 when the instructions are executed by the processor.

10. A non-transitory computer readable medium comprising instructions which, when the instructions are executed by a computer, causes the computer to carry out a method according to claim 1.

11. A computer implemented method for assessing a physically based simulation quality of glazed object, said method comprising:

(1) providing an input hyperspectral canopy hemispherical image of a real sky at given daylight conditions and an input image of a real glazed object under said real sky at same said daylight conditions, wherein both the hyperspectral canopy hemispherical image and the input image of the real glazed object are synchronous;

(2) physically based rendering a representative glazed object model of the real glazed object in a 3D scene, wherein an environment map in said 3D scene is computed from the input hyperspectral canopy hemispherical image of said real sky, and wherein the representative glazed object model is at same spatial location regarding said environment map in said 3D scene as the real glazed object regarding the real sky;

(3) calculating a colour difference in a given colour space between part of at least one glazing of the rendered representative glazed object model and the corresponding part of the corresponding at least one glazing of the real glazed object in the input image of said real glazed object, wherein said part of said least one glazing of the simulated representative glazed object model is in the view frustum of a virtual camera in the 3D scene, wherein a viewing angle of said virtual camera corresponds to a viewing angle of the real glazed object in the input image of the real glazed object, and wherein the real glazed object is in the input hyperspectral canopy hemispherical image of the real sky, and wherein the input image of the real glazed object is a portion of that image.

12. A system for assessing the physically based simulation quality of a glazed object, said system comprising:

means for synchronously acquiring a hyperspectral canopy hemispherical image of a real sky at given daylight conditions and an image of a real glazed object under said real sky at same said daylight conditions;

means, for physically based rendering a representative glazed object model of the real glazed object in a 3D scene, wherein the input hyperspectral canopy hemispherical image of said real sky is used as an environment map in said 3D scene, and wherein the representative glazed object model is at same spatial location regarding said environment map in said 3D scene as the real glazed object regarding the real sky;

means, for calculating a colour difference in a given colour space between part of at least one glazing of the simulated representative glazed object model and the corresponding part of the corresponding at least one glazing of the real glazed object in the input image of said real glazed object, wherein said part of said least one glazing of the simulated representative glazed object model is in the view frustum of a virtual camera in the 3D scene, wherein the viewing angle of said virtual camera corresponds to the viewing angle of the real glazed object in the input image of the real glazed object, wherein the means for synchronously acquiring comprises a hyperspectral 360° acquiring system which is adapted to acquire a hyperspectral canopy hemispherical image of a real sky and of a real glazed object at given daylight conditions, wherein a portion of said hyperspectral canopy hemispherical image comprises a real glazed object, and wherein the system further comprises means for extracting said portion of image from the hyperspectral canopy hemispherical image of the real sky.

13. The system according to claim 12, wherein said system further comprises a 3D scanner to acquire a 3D description of the real glazed object, and wherein means for physically based simulation is configured to simulate the representative glazed object model of the real glazed object from said 3D description.

14. A system for assessing the physically based simulation quality of a glazed object, said system comprising:
- means for synchronously acquiring a hyperspectral canopy hemispherical image of a real sky at given daylight conditions and an image of a real glazed object under said real sky at same said daylight conditions;
- means, for physically based rendering a representative glazed object model of the real glazed object in a 3D scene,
- wherein the input hyperspectral canopy hemispherical image of said real sky is used as an environment map in said 3D scene, and
- wherein the representative glazed object model is at same spatial location regarding said environment map in said 3D scene as the real glazed object regarding the real sky;
- means, for calculating a colour difference in a given colour space between part of at least one glazing of the simulated representative glazed object model and the corresponding part of the corresponding at least one glazing of the real glazed object in the input image of said real glazed object,
- wherein said part of said least one glazing of the simulated representative glazed object model is in the view frustum of a virtual camera in the 3D scene,
- wherein the viewing angle of said virtual camera corresponds to the viewing angle of the real glazed object in the input image of the real glazed object, and
- wherein the means for synchronously acquiring comprises:
- a hyperspectral camera which is adapted to acquire a hyperspectral canopy hemispherical image of a real sky at given daylight conditions,
- a digital camera which is adapted to acquire an image of a real glazed object under said real sky at same said daylight conditions;
- wherein the hyperspectral and digital cameras are assembled to each other by means of an automated rotation stage, and
- wherein said automated rotation stage allows a synchronous rotation of both hyperspectral and digital cameras so that the hyperspectral and digital cameras may acquire spatially and timely synchronized 360° images.

15. The system according to claim 14, further comprising a target pattern to be imaged by both the hyperspectral and digital cameras when acquiring the hyperspectral canopy hemispherical image of a real sky and the image of the real glazed object, and
- wherein means for physically based simulation is configured to compute the spatial location of the representative glazed object model in the 3D scene from images of the target pattern.

* * * * *